United States Patent [19]
Carder

[11] 3,854,610
[45] Dec. 17, 1974

[54] FREIGHT TRANSPORTER AND LOADER FOR AIRCRAFT

[75] Inventor: Victor H. Carder, San Francisco, Calif.

[73] Assignee: Cochran-Boothe Airport Systems, San Francisco, Calif.

[22] Filed: Apr. 9, 1973

[21] Appl. No.: 349,417

[52] U.S. Cl.................. 214/520, 198/239, 198/265, 214/522, 214/512, 214/83.36, 214/38 BA
[51] Int. Cl............................................. B60p 1/44
[58] Field of Search...... 244/137 R; 214/83.36, 520, 214/521, 522, 512, 38, 518; 198/33 AB, 21, 102, 190

[56] References Cited
UNITED STATES PATENTS

| | | | |
|---|---|---|---|
| 2,637,433 | 5/1953 | Shuttleworth | 198/33 AB |
| 3,108,677 | 10/1963 | Temple | 198/21 |
| 3,540,568 | 11/1970 | Wellauer | 198/33 AB |
| 3,643,785 | 2/1973 | Bostedt | 214/83.36 |
| 3,712,495 | 1/1973 | Carder et al. | 214/520 |
| 3,735,885 | 5/1973 | Comfort | 214/84 |

Primary Examiner—Robert G. Sheridan
Assistant Examiner—G. L. Auton
Attorney, Agent, or Firm—Naylor, Neal & Uilkema

[57] ABSTRACT

The freight transporter and loader of the disclosure is a vehicle having a power-driven, steerable wheeled chassis and having an elevator support bed. The bed is provided with multiple conveyors arranged to handle either three rows of LD–3 type cargo containers or two rows of LD–7 type containers. The bed is provided with a number of parallel conveyors extending along the length of the bed, conveyor elements to selectively drive the cargo containers transversely of the bed from one longitudinal conveyor to another, and is also provided with means enabling cargo containers to be reoriented through 180° turns. The support bed is provided with an interface or extension unit to enable an aircraft to be loaded or unloaded. The interface unit is selectively shiftable transversely of the forward end of the support bed so as to be used in conjunction with a selected one of the number of longitudinal conveyors on the support bed. The interface unit can be extended and brought into coupled relationship with the sill of the freight loading doorway of the aircraft. The interface unit may also be pivoted both horizontally and vertically relative to the support bed. The vertical pivotal movability of the interface unit is related through a sensing and control system to automatic vertical adjustment of the elevator support bed in accordance with the lowering of the aircraft body as it takes on the freight and raising of the aircraft body as freight is unloaded.

3 Claims, 35 Drawing Figures

FREIGHT TRANSPORTER AND LOADER FOR AIRCRAFT

BACKGROUND OF THE INVENTION

The freight handling vehicle of the invention is especially designed to expedite the transporting and loading and unloading of cargo containers in conjunction with wide-body jet aircraft in this country which presently consist of Boeing 747, the McDonald-Douglas DC-10 and the Lockheed L-1011. These planes are still being freight-loaded with equipment of the type which has been used for years to load the 707 and DC-8 jet aircraft. The inevitable trend is toward utilization of the wide-body jet aircraft to carry freight and passengers at the same time. With the presently known freight handling and loading equipment, LD-3 and LD-7 type cargo containers are loaded in the cargo plane areas of large airports, transported by slow trailer train carriers to the passenger areas which are frequently located at substantial distances from the cargo plane areas, and loaded into the aircraft slowly through the use of conventional airline support equipment. With this old type of freight handling equipment, it takes about one-half hour at the San Francisco airport to load a Boeing 747 passenger-freight jet aircraft at the passenger terminal with its full load of allotted freight, a job which takes the subject freight handling vehicles about ten minutes.

The present transporter/loader is a large scale vehicle of about 50 feet in length, 16 feet or so in width, and having a highway speed of 25 mph or more. One such unit can hold 16 LD-3 units. Two of these transporter/loaders can entirely load a forward and rear freight compartment of a 747 with a substantial saving in aircraft loading time.

DESCRIPTION OF THE INVENTION:

The various objects and advantages of the invention will be apparent from the foregoing and from the following description taken in conjunction with the drawings forming part of this specification, and in which:

2

FIG. 35 is a semi-schematic view showing in top plan the parts of FIG. 3 and their operational elements. With reference initially, for the broader details of the vehicle embodying the inventions, to FIGS. 1-9, the vehicle comprises a wheeled chassis 10, an operator's cab 12, an elevator support bed 14, an interface or extension unit 16, and an operator's console 18.

As shown in FIGS. 6-9, bed 14 is supported on chassis 10 for raising and lowering movement by four pairs of scissors links 20, two pair being located along each side of the vehicle, operated by cylinders 22 and supported by fore and aft stabilizing scissors links 24. The bed 14 is preferably provided with removable stake panels 26.

Figures 3, 4, 5:
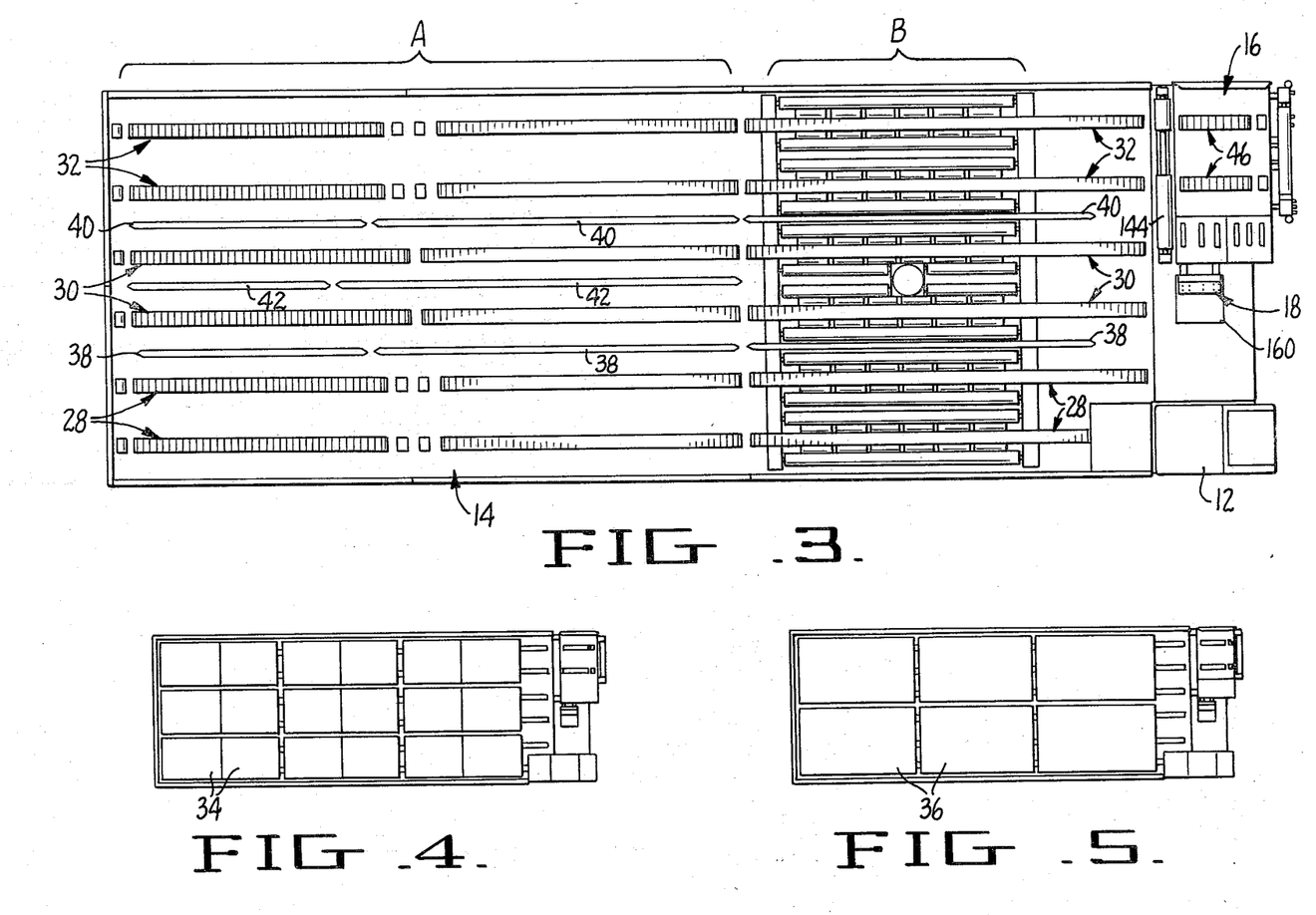
FIG. 3 is a top plan view of the vehicle without cargo containers.
FIG. 4 is a reduced scale top plan view of the vehicle with a full load of smaller cargo containers.
FIG. 5 is a similar view of the vehicle with a full load of larger cargo containers.
Figure 6:
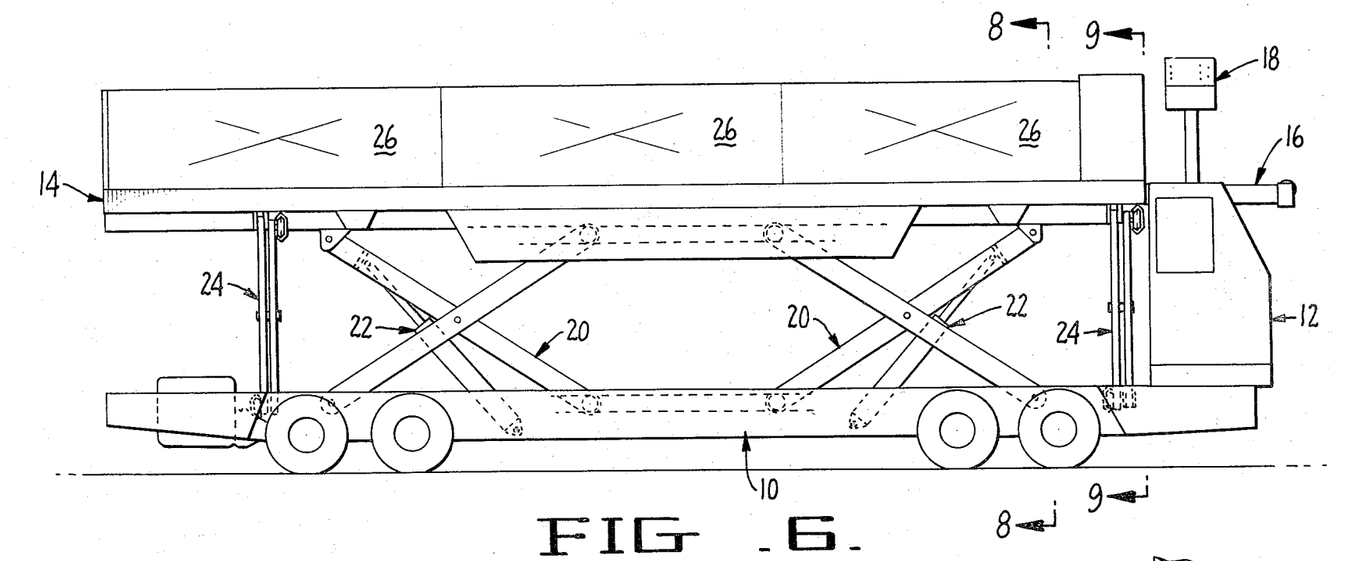
FIG. 6 is a view in side elevation of the vehicle showing the elevator support bed in raised position.
Figure 7:
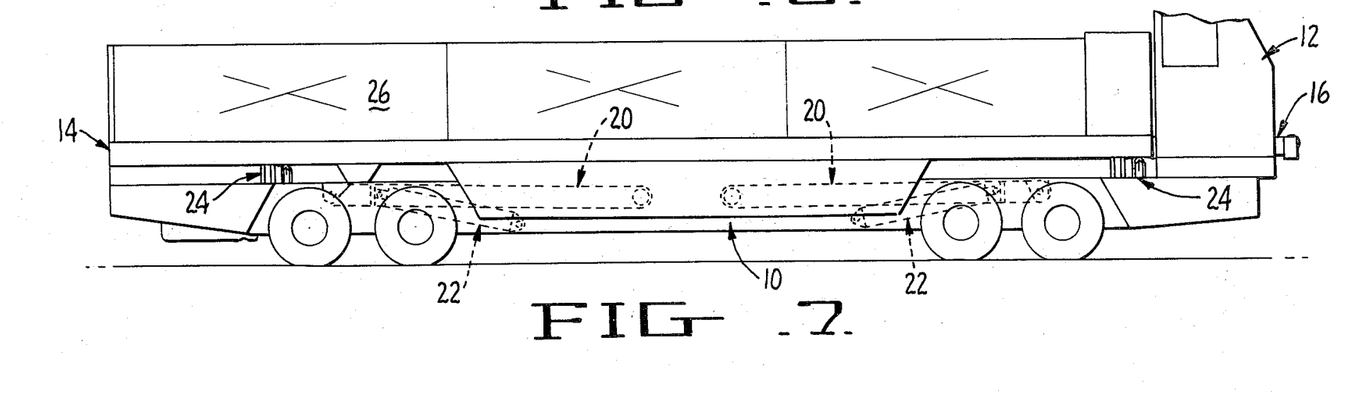
FIG. 7 is a similar view showing the elevator support bed in lowered position.
Figure 8:
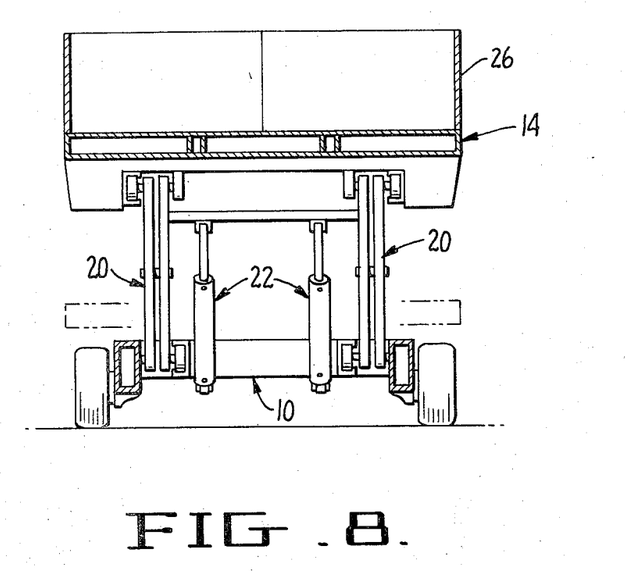
FIG. 8 is a view taken along lines 8—8 of FIG. 6.
Figure 9:
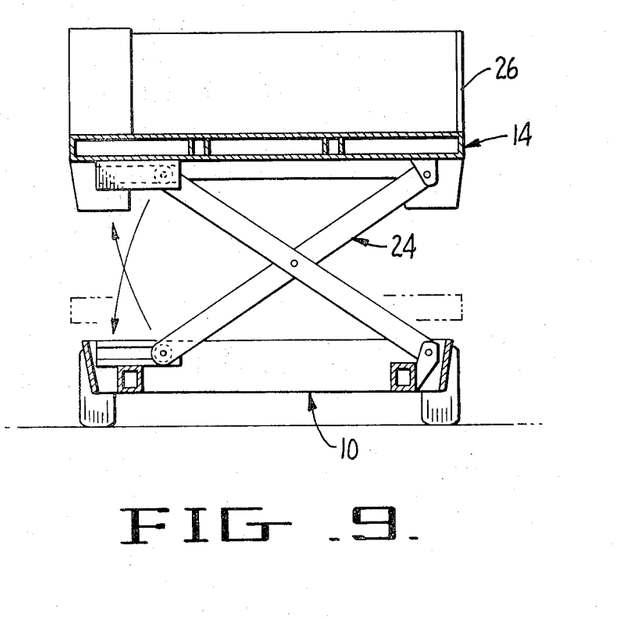
FIG. 9 is a view taken along lines 9—9 of FIG. 6.
Figure 10:
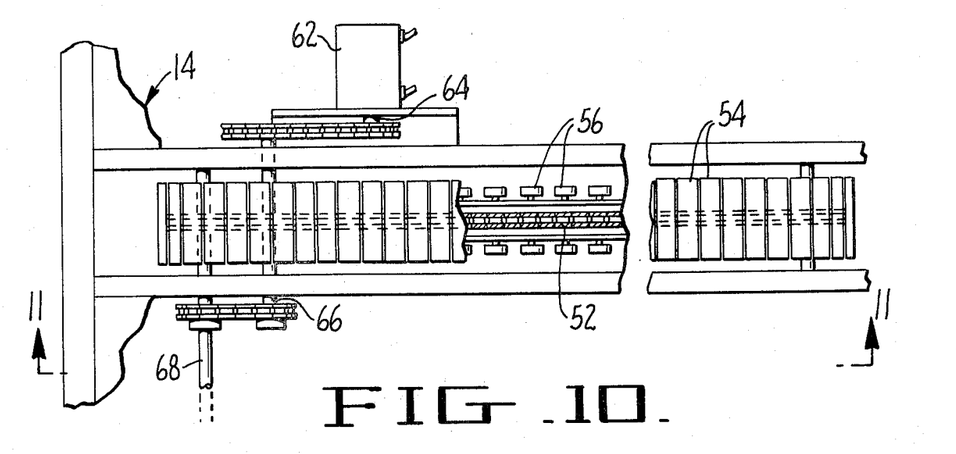
FIG. 10 is an enlarged detail view in top plan showing one of the six conveyor tracks of the support bed conveyor system of FIG. 3.
Figure 11:
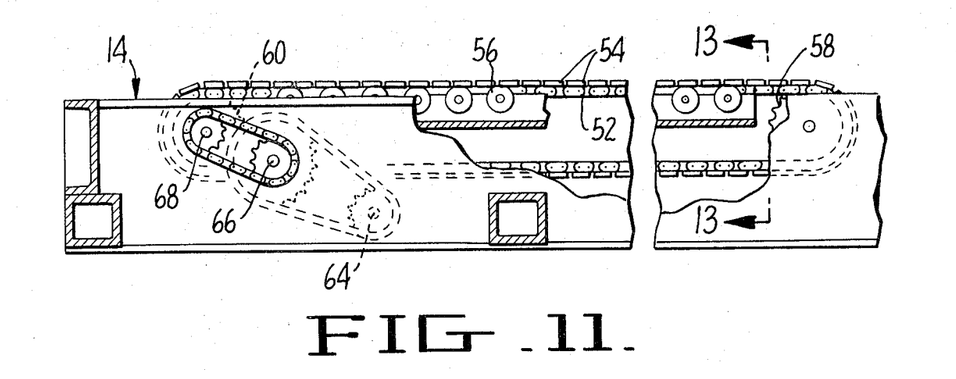
FIG. 11 is a view taken along the lines 11—11 of FIG. 10.
Figure 12:
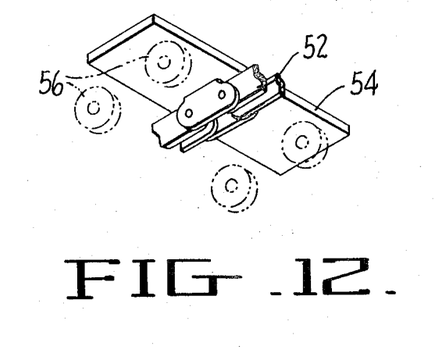
FIG. 12 is a detail view in perspective of the conveyor of FIG. 13.
Figure 13:
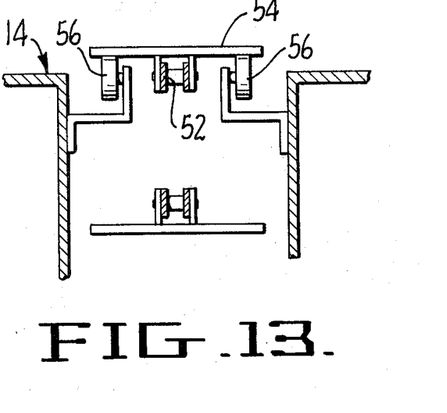
FIG. 13 is an enlarged view taken along lines 13—13 of FIG. 11.
Figure 14:
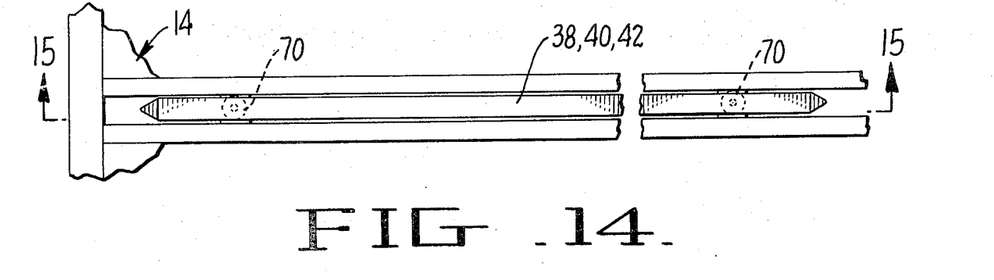
FIG. 14 is an enlarged detail view in top plan of one of the cargo row divider elements of FIG. 3.
Figure 15:
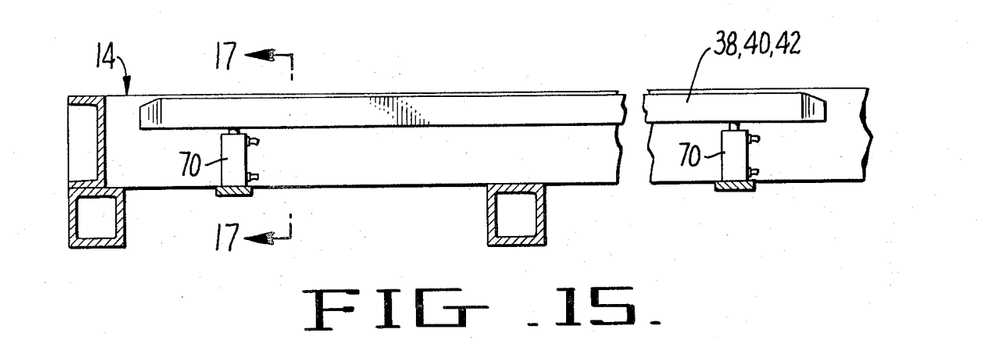
FIG. 15 is a view taken along lines 15—15 of FIG. 14, showing the divider element in a lowered position.
Figure 16:
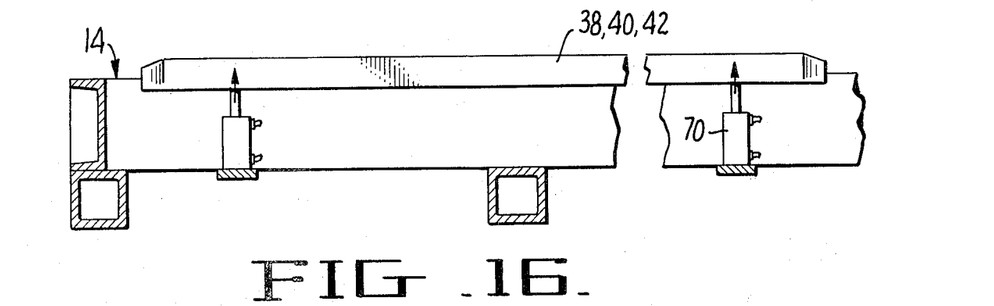
FIG. 16 is a similar view showing the divider element in raised position.
Figure 17:
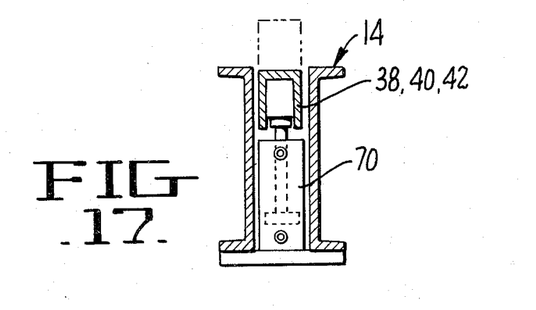
FIG. 17 is an enlarged view taken along lines 17—17 of FIG. 15.
Figure 18:
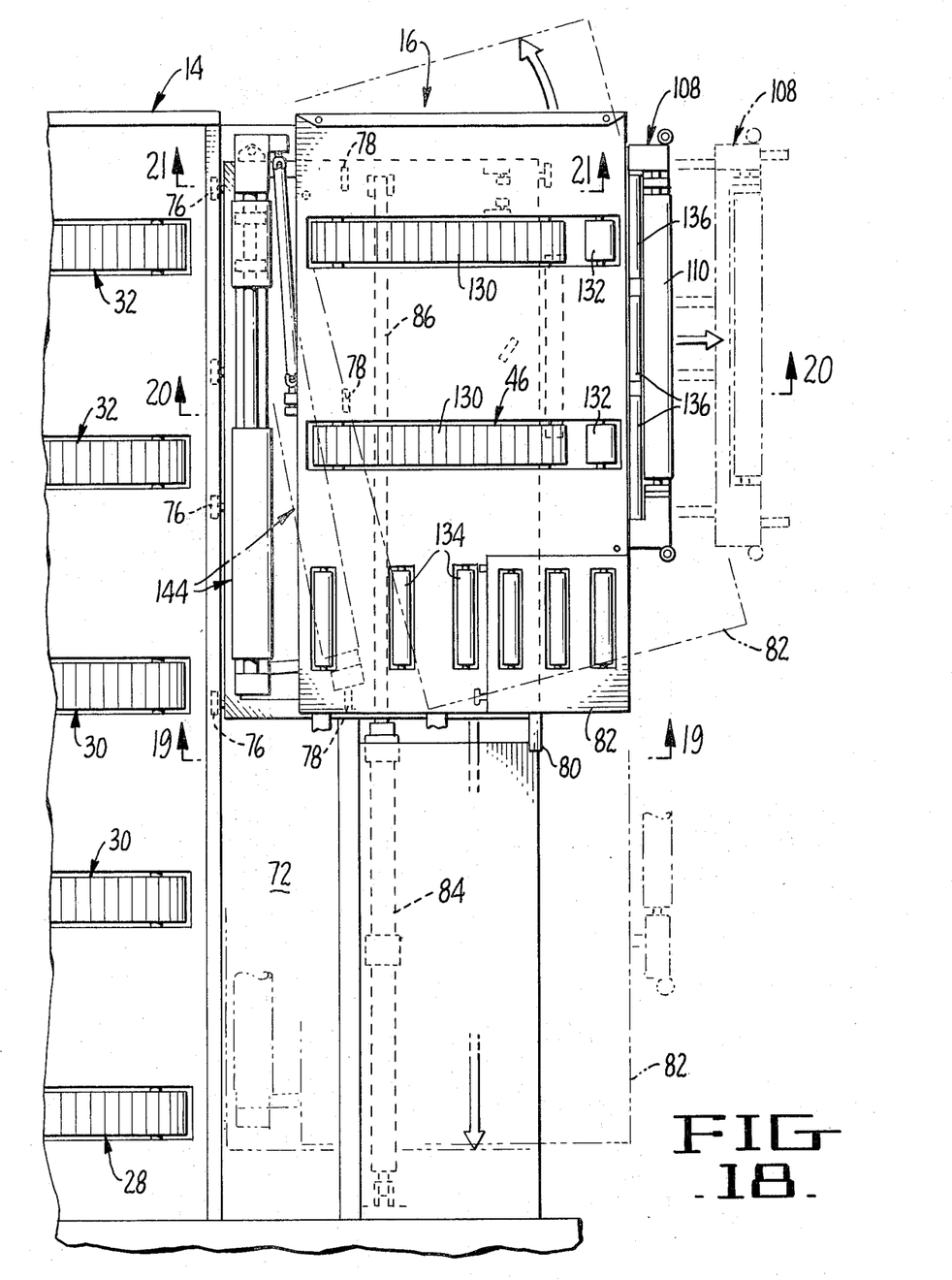
FIG. 18 is an enlarged top plan view of the forward end of the support bed and the interface unit.
Figure 19:
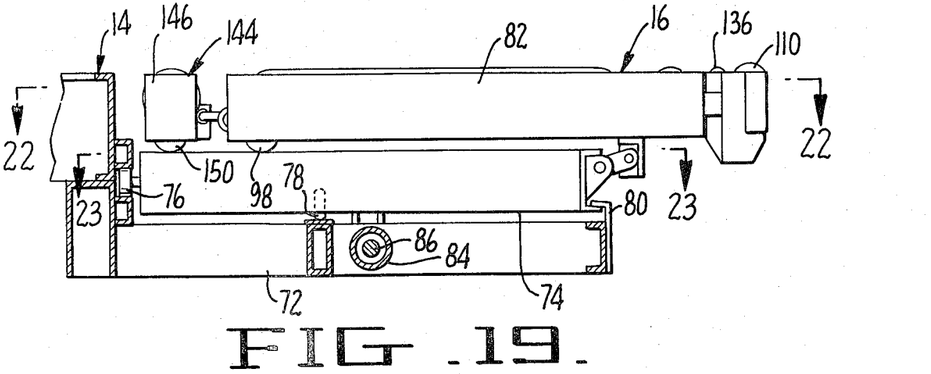
FIG. 19 is a view taken along lines 19—19 of FIG. 18.
Figure 20:
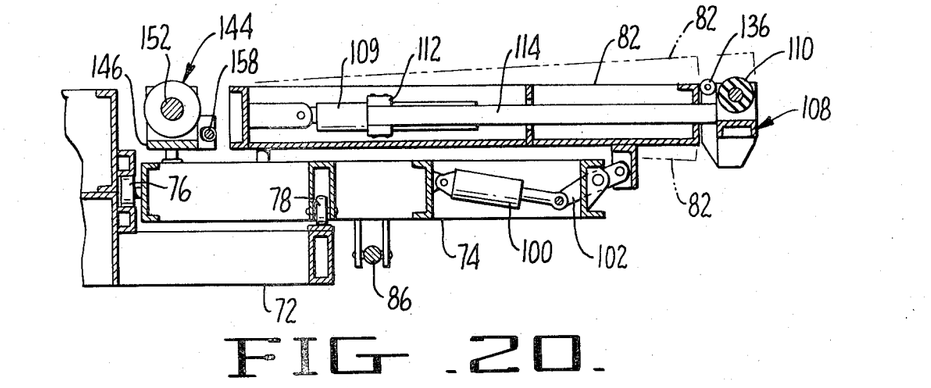
FIG. 20 is a view taken along lines 20—20 of FIG. 18.

Carried by bed 14 (see FIG. 3) are conveyors 28, 30 and 32, constituting in one condition for operation the means for handling three abreast rows of LD-3 containers, as shown in FIG. 4, and in another condition of operation adapted to constitute two three-chain conveyors operable to handle two rows of LD-7 cargo containers as shown in FIG. 5. The LD-3 containers are designated by reference no. 34 and the LD-7 containers are designated by reference no 36. The bed is provided with vertically movable divider strips 38 and 40 adapted to keep the three rows of containers shown in FIG. 4 separated from each other and 42 adapted to keep the two rows of containers shown in FIG. 5 separated from each other.

In stage A (see FIG. 3) the containers are merely movable either forwardly or rearwardly along the length of the bed. In stage B the containers are movable both forwardly and rearwardly lengthwise of the bed and are also movable transversely of the bed, from any one to any other of the conveyors 28, 30, 32, by roller conveyors 44. Stage B is the lateral distribution stage of the bed conveyor systems.

Interface or extension unit 16 is movable transversely of bed 14 to align its power conveyor 46 with conveyor 32 or conveyor 30, is swingable in a horizontal plane relative to bed 14 (see FIG. 2) so that it may be squarely aligned with cargo hatch or doorway 48 while the bed 14 is lined up parallel to the trailing edge 50 of the aircraft, and is pivotally related to the bed with reference to a vertical plane in order to move up and down some slight degree with the aircraft body and thereby operate limit switches to cause bed 14 to be driven up or down in accordance with corresponding movement of the aircraft body.

SPECIFIC DETAILS a. The Longitudinal Bed Conveyors

Figure 35:
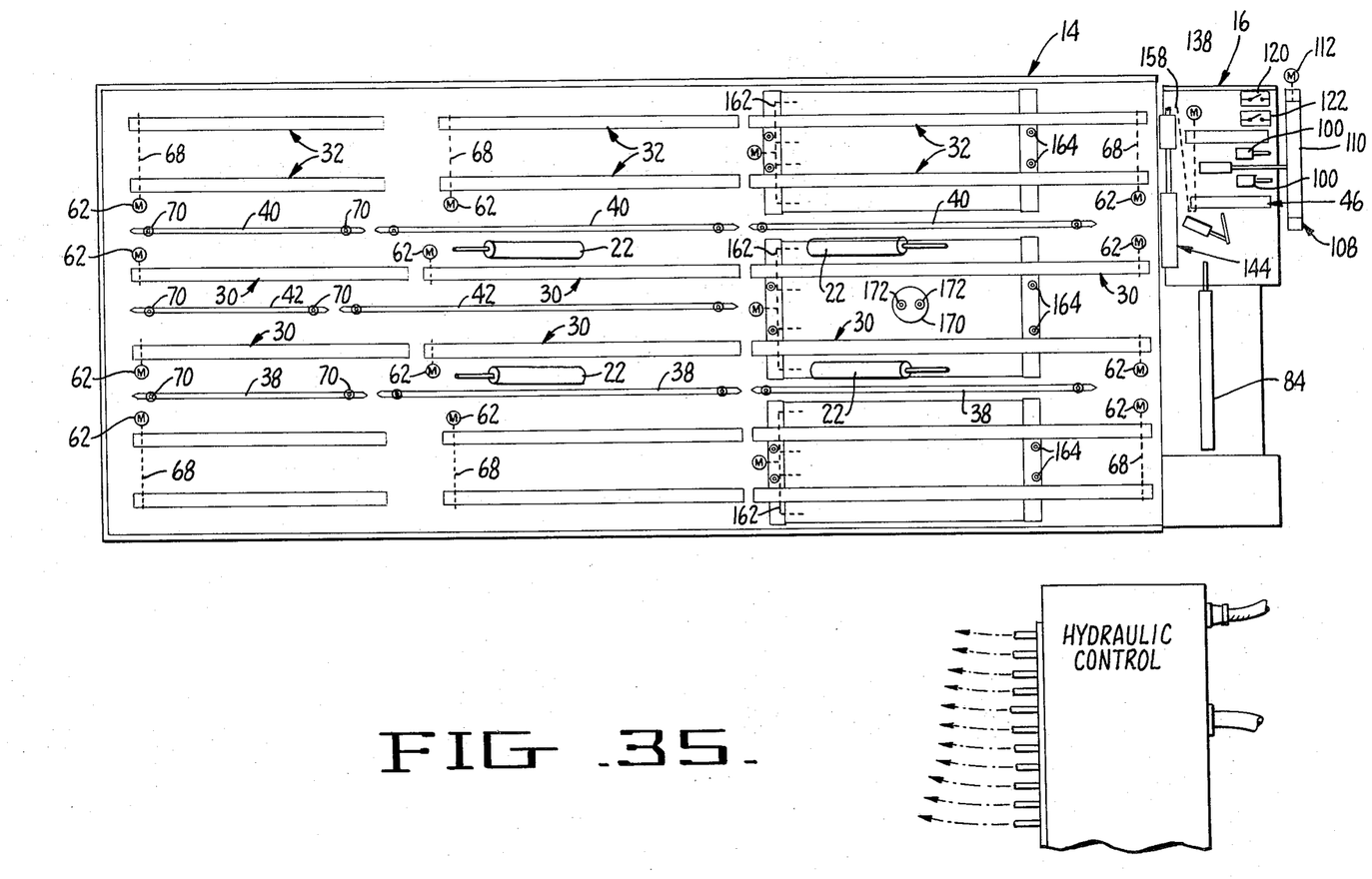

Conveyors 28, 30 and 32 are shown in more complete detail in FIGS. 10–13. They comprise chains 52, plates 54 connected to the chains, support rollers 56, idler and drive sprockets 58 and 60 and drive means comprising reversible motor 62, motor output shaft 64, jack shaft 66 and drive sprocket shaft 68. There is one motor 62 for each of the pairs of conveyor tracks 28 and 32, while each of the tracks making up the conveyor 30 is driven by another motor 62, as indicated in FIG. 35.

The barrier members 38, 40, 42 are shown in specific detail in FIGS. 14–17. Each such member is carried by a pair of hydraulic cylinders 70 and is selectively movable between the low position of FIG. 15 and the high position of FIG. 16. Insofar as stage A (see FIG. 3) is concerned, barrier members 38 and 40 are raised and barrier members 42 are lowered when the freight load condition is as shown in FIG. 4, while barrier members 38 and 40 are lowered and barrier members 42 are raised when the freight load condition is as shown in FIG. 5. Barrier members 38 and 40 of stage B are raised in the FIG. 4 condition and are lowered when the transverse drive conveyor rollers 44 are raised and operated, as hereinafter described, to drive cargo containers laterally of the bed in stage B.

b. The Interface or Extension Unit

The details of this unit are shown in FIGS. 18–28. It comprises a stationary base frame 72 (FIG. 19), intermediate frame 74 supported for transverse movement with respect to base frame 72 by rollers 76 and 78 and guide member 80, and upper frame 82 carried by intermediate frame 74. Frames 74 and 82 are moved transversely of the front end of the support bed 14 by hydraulic cylinder 84 and cylinder rod 86, the former being connected to base frame 72 and the latter being connected to intermediate frame 74.

Figure 23:
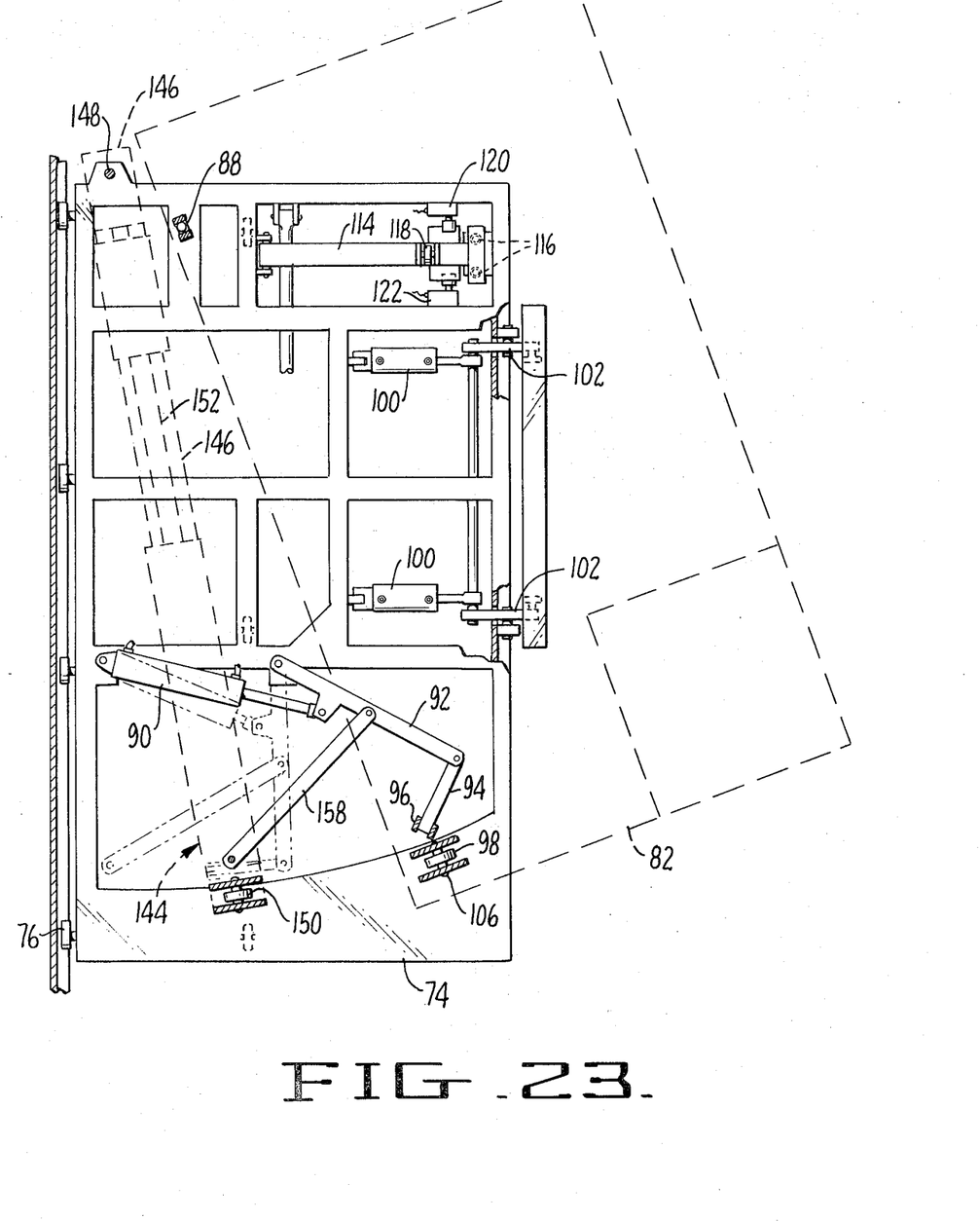
FIG. 23 is a view taken along line 23—23 of FIG. 19.
Figure 24:
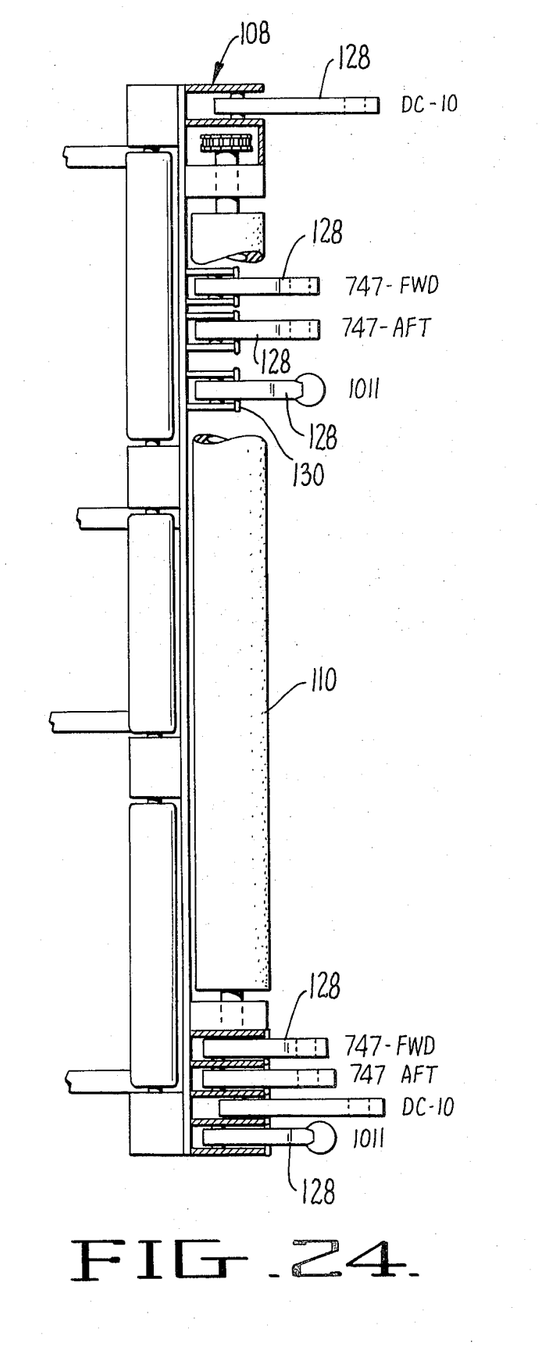
FIG. 24 is an enlarged detail view in top plan of the forward end of the interface unit, particularly showing the selectively usable aircraft connectors for the 747, DC-10 and L-1011 aircraft.
Figure 25:
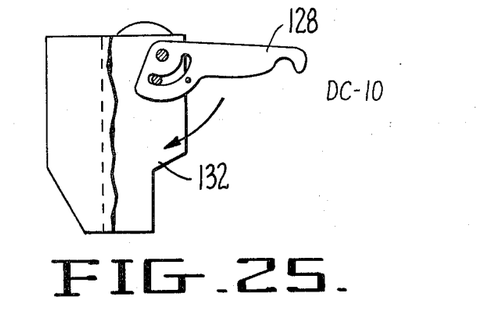
FIGS. 25-28 are views in side elevation of these particular aircraft connector members.
Figure 26:
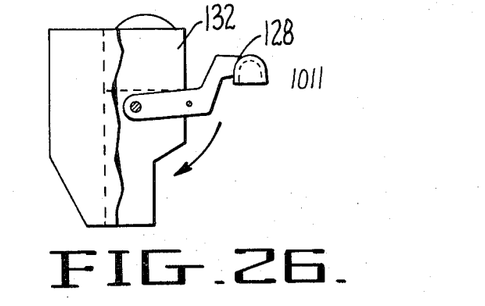
Figure 27:
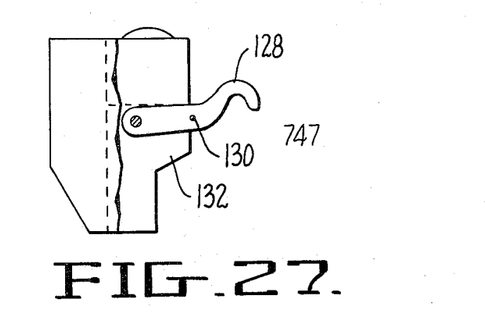
Figure 28:
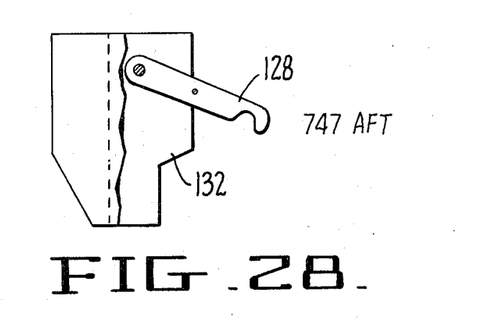
Figure 29:
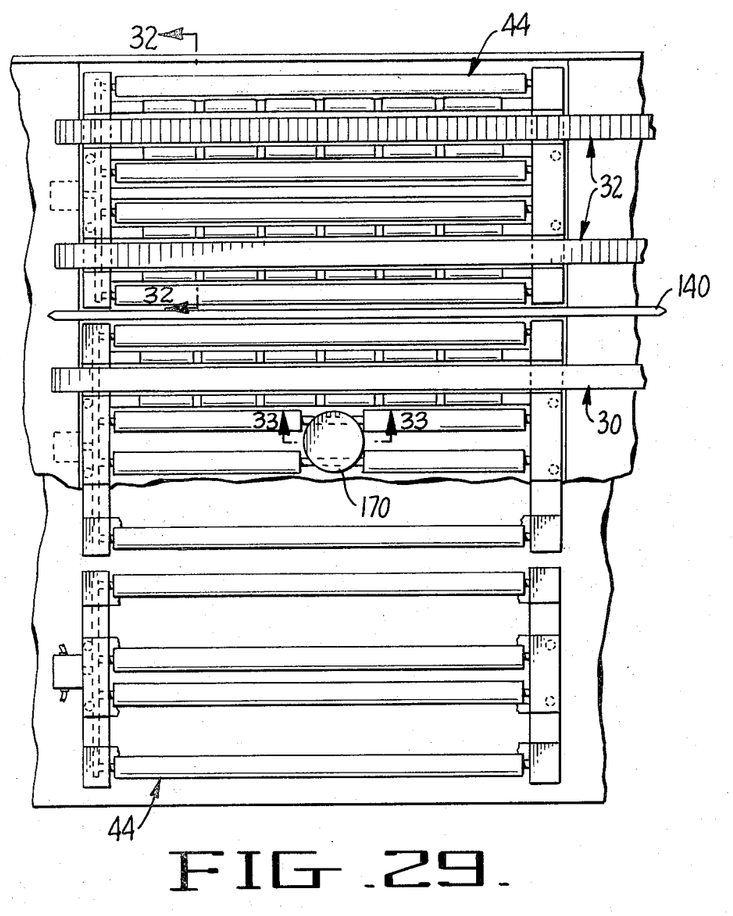
FIG. 29 is an enlarged top plan view of the transverse drive conveyor and container rotation stage of FIG. 3.
Figure 30:
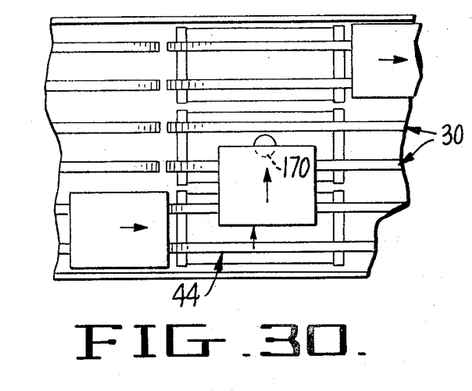
FIG. 30 is a semi-schematic view illustrating a sequence of handling of cargo container units on the elevator support bed of FIG. 3.
Figure 31:
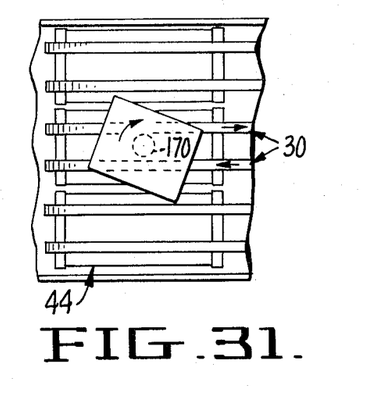
FIG. 31 is a semi-schematic view illustrating cargo container rotation on the elevator support bed of FIG. 3.
Figure 32:
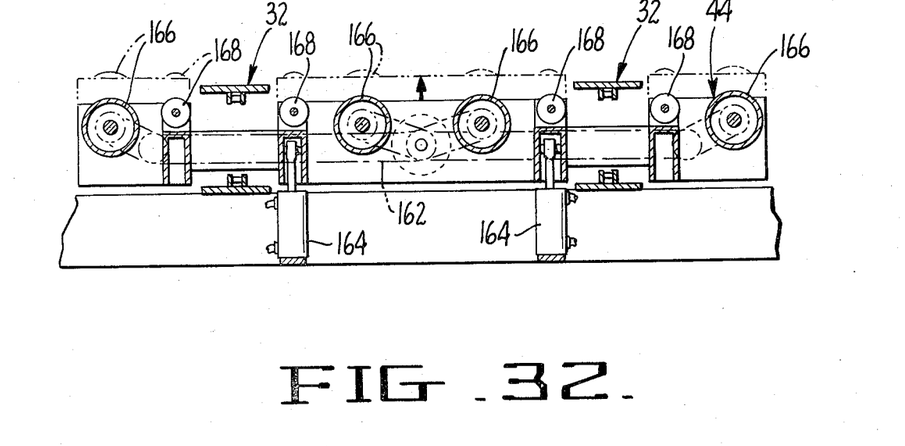
FIG. 32 is an enlarged detail view taken along lines 32—32 of FIG. 29.
Figure 33:
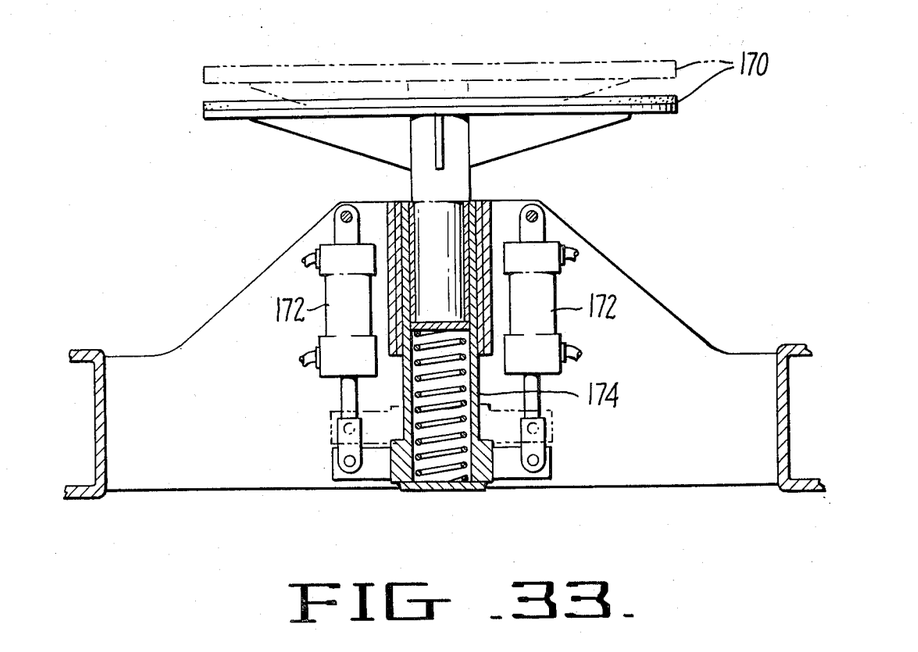
FIG. 33 is an enlarged detail view taken along lines 33—33 of FIG. 29.

The upper frame 82 is pivotally connected to frame 74 for limited horizontal swinging movement, as illustrated in FIG. 23.

Figure 21:
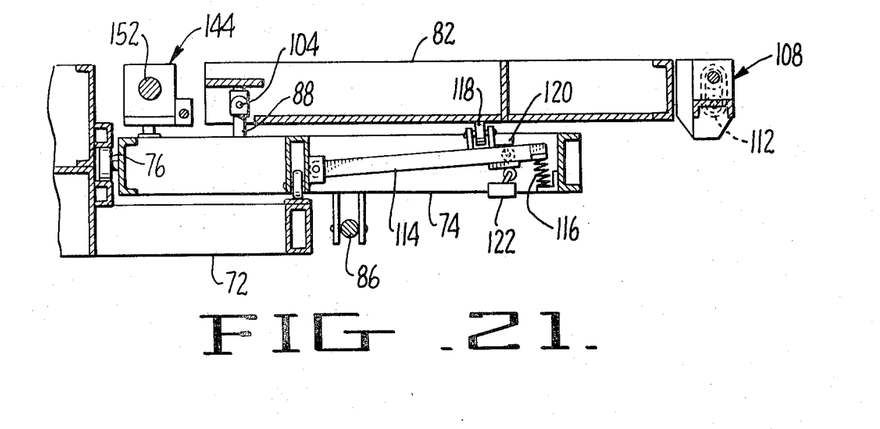
FIG. 21 is a view taken along lines 21—21 of FIG. 18.

The vertical pivot axis for upper frame 82 is the axis of stub shaft 88 (FIGS. 21 and 23). Frame 82 is pivotally moved about the axis of shaft 88 by means (see FIG. 23) comprising cylinder 90, lever arm 92, link 94 and yoke 96, being supported by roller 98 which rides on the intermediate frame 74.

Frame 82 is also mounted for limited vertical swinging movement (see FIG. 20) by means comprising cylinders 100, rocker arms 102 and pivot axis defining means 104 and 106 (FIGS. 21 and 23).

Frame 82 is provided with extensible sub-frame 108 which is connected to cylinder 109 (see FIGS. 20 and 22) by crosshead 112 and arms 114. The piston rod of cylinder 109 remains stationary while the cylinder itself moves inwardly or outwardly to move the assembly 108 between the dotted outline and solid outline position shown in FIG. 22.

The extension assembly 108 comprises roller 110 which is power-driven by drive train elements 112 including a motor (FIG. 35).

The interface unit is provided with means (FIGS. 21 and 23) for controlling the operating level of bed 14 in accordance with the angle of vertical tilt of platform 82, said means comprising levers 114 pivotally attached to frame 74 and urged by springs 116 to bear rollers 118 against frame 82, arms 114 being in control relation to limit switches 120 and 122. When the aircraft body moves downwardly under the freight load frame 82 pivotally follows it, depressing lever arms 114 and closing switch 122 to enable bed-lowering operation of cylinders 22. When the aircraft during unloading moves upwardly springs 116 cause arms 114 to close switch 120 and thereby operate cylinders 22 to drive bed 14 upwardly.

The extension assembly 108 (see FIGS. 24–28) is provided with a plurality of selectively usable hook or latching elements 128, all shown in their outwardly extended or operative positions in FIGS. 24–28, adapted to connect the interface unit with the loading door spindles of the aircraft. These elements 128 are maintained in extended positions for operation by removable pins 130 which bear against the leading edges of support plate members 132. As indicated by the notations adjacent FIGS. 24–28 the members 128 are used in pairs depending upon the aircraft being handled and in most cases whether the cargo door is the forward one of the aft one.

Frame 82 of the interface unit 16 is provided with power conveyor 130 and with idler conveyor rolls 132 and 134. The extension assembly 108 is also provided with idler conveyor rollers 136. Conveyor 130 is constructed similarly to conveyors 28, 30 and 32. The conveyor drive system comprises (FIG. 22) motor 138, jack shaft 140 and conveyor drive shaft 142.

Figure 22:
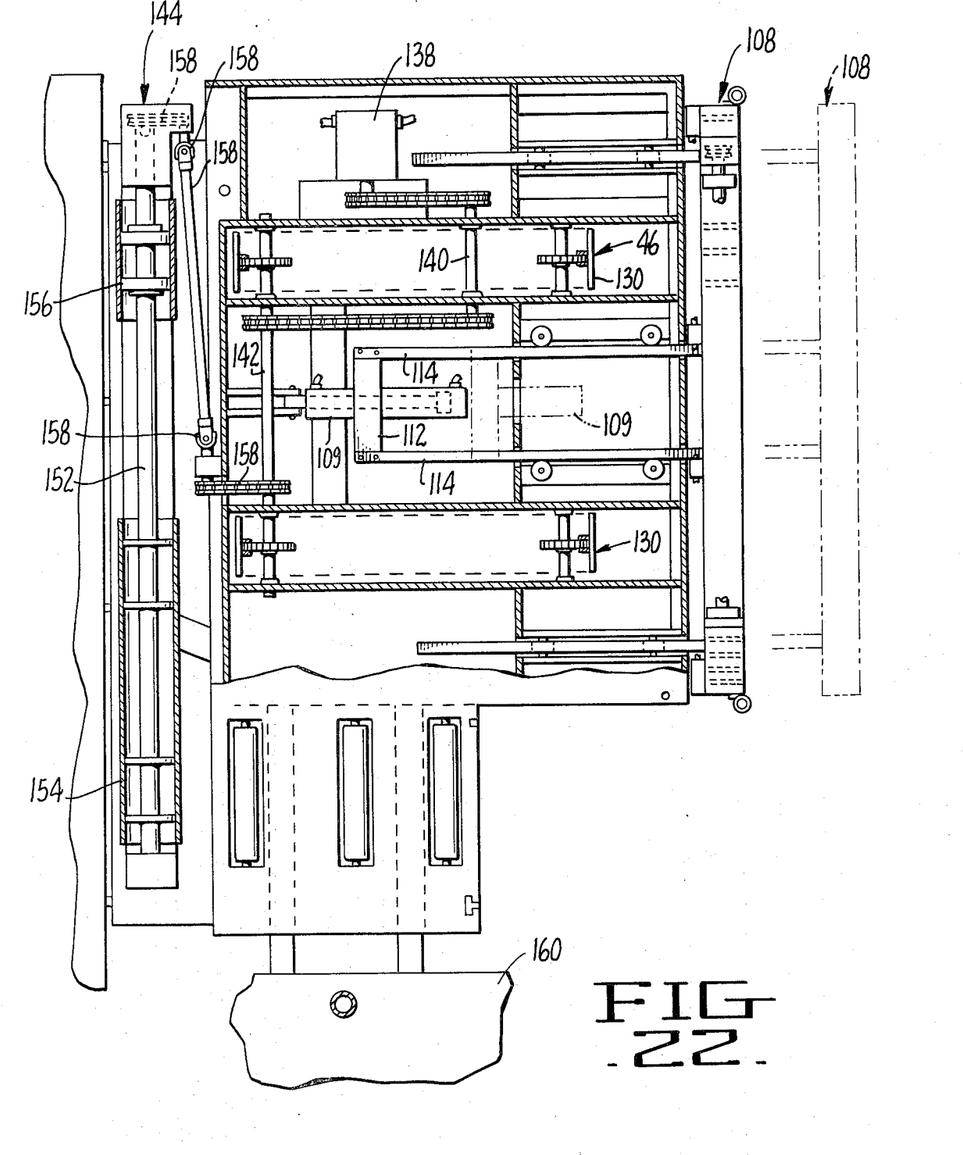
FIG. 22 is a view taken along lines 22—22 of FIG. 19.

Conveyor means 144 (FIG. 18–23) is provided as a trailing part of interface unit 16, said means 144 comprising housing 146 having a pivot connection 148 with intermediate frame 74 and supported on frame 74 at its other end by roller 150. Carried for rotation by frame 146 is shaft 152 which drives conveyor roller 154 and supports idler roller 156 (FIG. 22). As best shown in FIG. 23, when frame 82 is pivoted through an angle X conveyor means 144 is pivoted through an angle of approximately X/2 by means comprising cylinder 90, lever 92 and link 158. The drive means for the shaft 152 comprises drive shaft 142 and power train elements 158 driven thereby (see FIG. 22).

Also mounted on frame 82 of interface unit 16 is the operator's console 18 and its support platform 160.

c. Stage B of the Main Bed

These details are shown in FIGS. 29-33. The conveyor rollers 44 are arranged in sub-assemblies (see FIG. 32) comprising carrier 162, a pair of cylinders 164 for raising and lowering the carrier, power-driven rollers 166 and idler rollers 168. When the rollers 166 and 168 are in the raised dotted lines positions shown in FIG. 32, cargo containers, 34 or 36 as the case may be, may be driven transversely of stage B for placement on a selected one of the conveyors 28, 30, 32.

Means are provided in stage B to reorient a cargo container, as for example when the last LD-3 unit on the transporter/loader has its beveled end wrongly oriented with respect to the shape of the last space within the plane to be filled with such a cargo container. The reorienting means comprises means for driving the tracks of center conveyor 30 in opposite directions and pivot pad 170 to yieldingly engage the bottom of the container to facilitate its rotation under the opposite forces applied to the container by the oppositely moving tracks of conveyor 30. Pad 170 is raised from the solid line inoperative position shown in FIG. 33 to the dotted line operative position by cylinders 172 operative to raise and lower sleeve 174 and thereby raise and lower pad 170.

d. Operation

Figure 1:
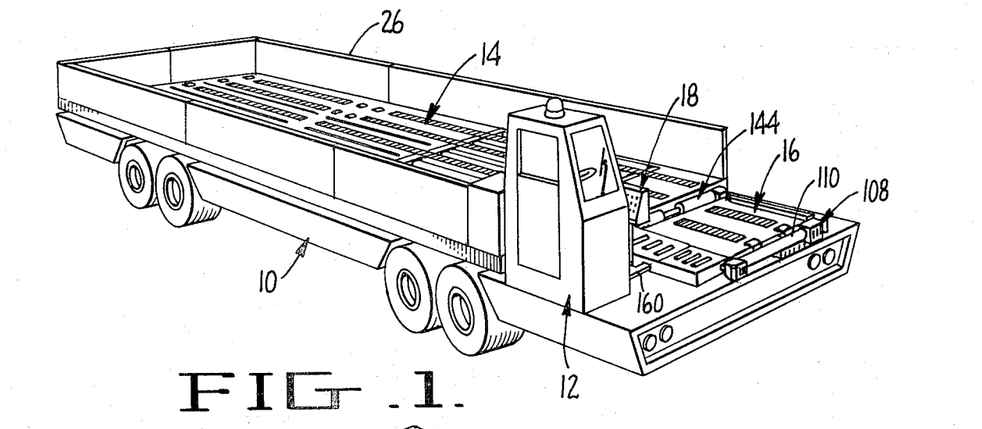
FIG. 1 is a view in perspective of the transporter and loader embodying the present invention.
Figure 2:
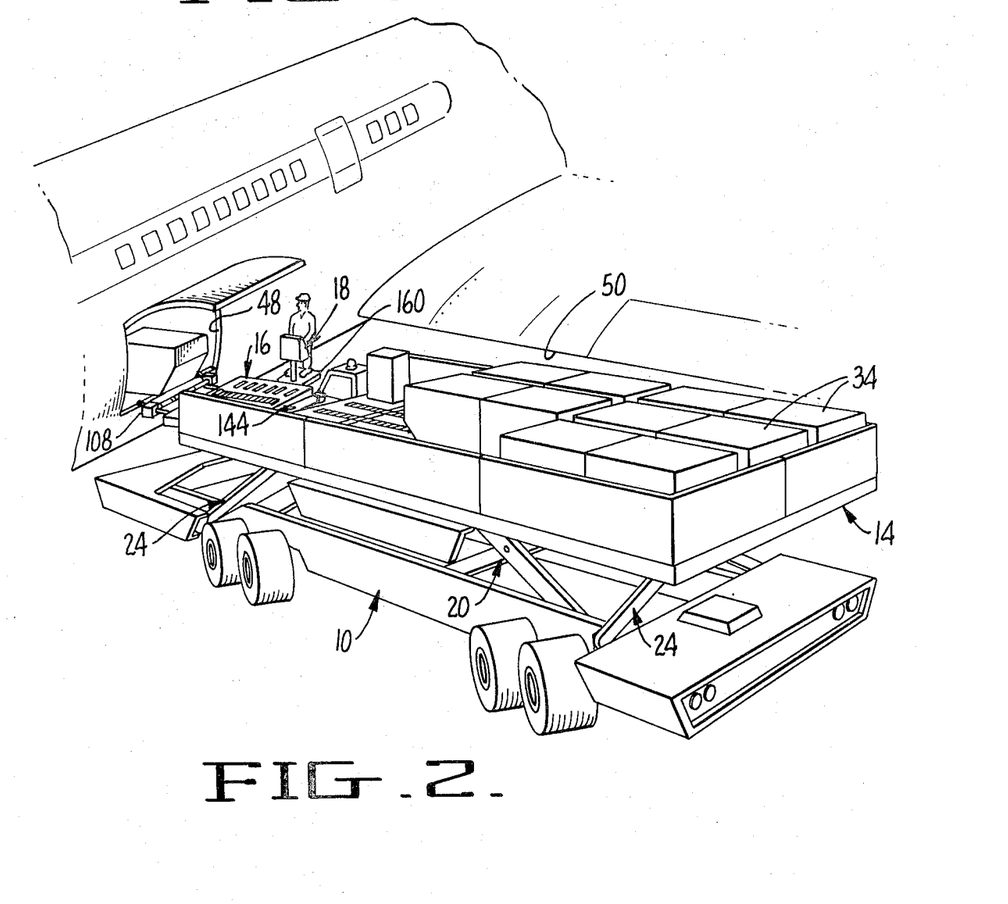
FIG. 2 is a view in perspective of the vehicle during the course of an aircraft freight loading operation.
Figure 34:
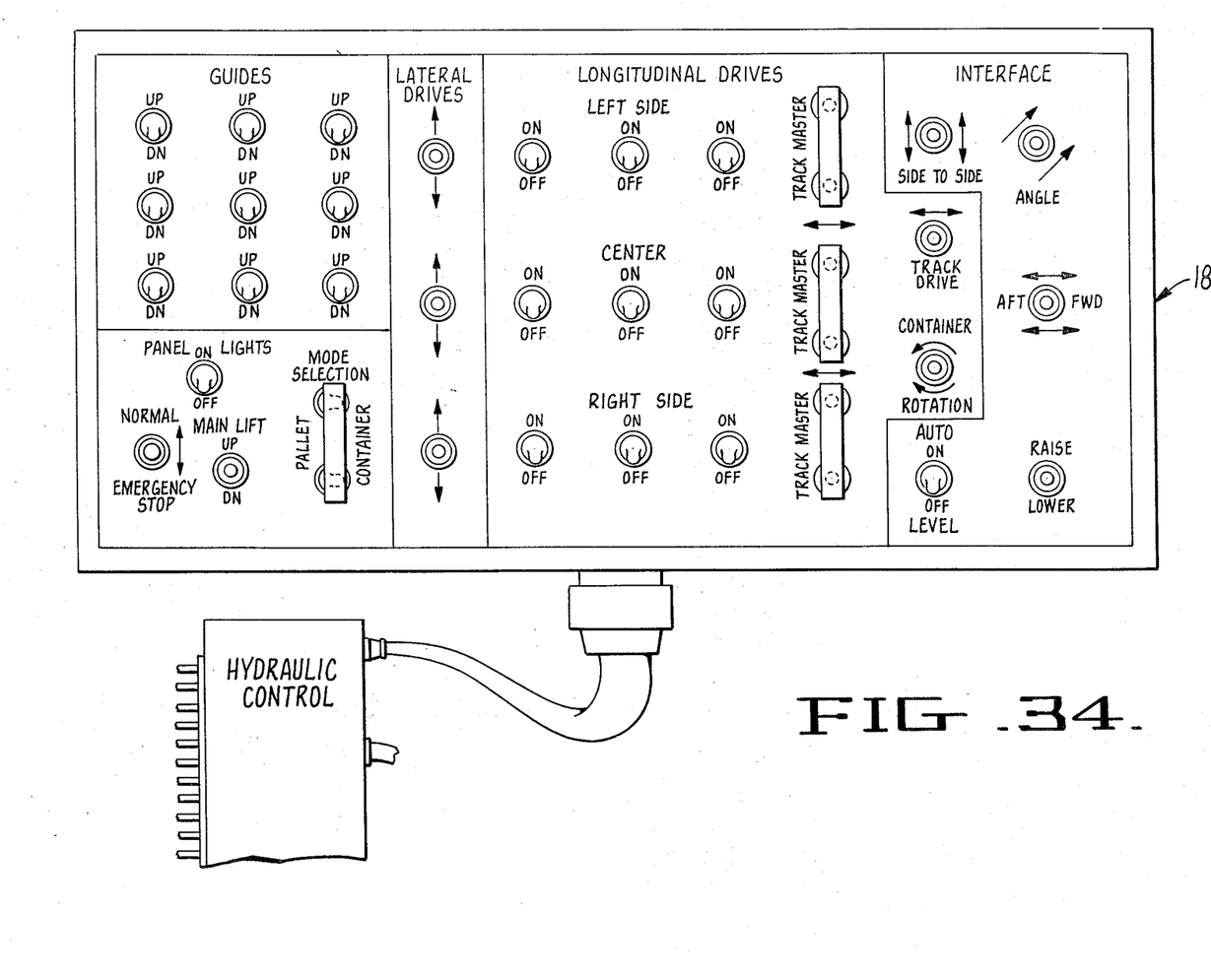
FIG. 34 is a semi-schematic view of the control panel for the vehicle.

FIG. 2 shows the vehicle in the process of loading containers into the aft cargo hatch of one of the wide-body aircraft. The vehicle is maneuvered to bring the long sides of the bed 14 into parallel relation with the swept-back trailing edge of the wing of the aircraft and the interface unit 16 is then pivotally maneuvered into a position where it is normal to the hatch and in appropriate container-receiving relation to the appropriate bed conveyor 30, 32. Bed 14 is raised to approximately the level of the lower edge of the hatchway. Extension assembly 108 is then driven forward to make contact with the aircraft and, if necessary, the frame 82 is then power-tilted by means 100, 102 to connect the appropriate latching members 128 with the loading door spindles. The auto-leveling control is then switched on (see console 18 in FIG. 34). This causes bed 14 to be vertically moved to remove the tilt condition of the interface unit and thereafter the bed and interface unit are maintained in substantial horizontal alignment with the bottom of the hatchway opening.

All of the rest of the operational details have been previously described.

What is claimed is:

1. A freight unit transporter and loader vehicle for aircraft comprising a conveyor support bed, a pair of conveyor tracks mounted on the bed for movement lengthwise thereof, means for driving the tracks in the same direction, means for driving the tracks in opposite directions, and freight unit support means located between the tracks and operable when the tracks are driven in opposite directions to assist in pivotally reorienting a freight unit carried by the tracks, said support means comprising a pad member, having a freight unit contacting surface of substantial, horizontally disposed area means mounting said member for movement upwardly to an operative position in engagement with the underside of a freight unit and for movement downwardly to an inoperative position out of engagement therewith, and means to raise and lower said member.

2. The combination of claim 1, said means to raise and lower said member including means causing said member to yieldingly engage a freight unit.

3. The combination of claim 1, said means mounting said member enabling turning movement of said member about a vertical axis.

* * * * *